Oct. 21, 1941. R. E. MADISON ET AL Re. 21,928

COLOR TREATMENT OF CONCRETE

Original Filed Nov. 20, 1939

INVENTORS.
Ralph E. Madison,
BY Arthur T. Saunders.
Everett Allright
ATTORNEY

Reissued Oct. 21, 1941

Re. 21,928

UNITED STATES PATENT OFFICE 21,928

COLOR TREATMENT OF CONCRETE

Ralph E. Madison, Detroit, Mich., and Arthur T. Saunders, Tulsa, Okla., assignors to Truscon Laboratories, Inc., a corporation of Michigan Original No. 2,220,341, dated November 5, 1940, Serial No. 305,410, November 20, 1939. Application for reissue April 26, 1941, Serial No. 390,636

9 Claims. (Cl. 106—224)

This invention relates to the treatment of floors and other structures of cement mortar, concrete, natural and artificial stone and the like.

The principal object of this invention is to provide a novel composition for mass color treating and dressing concrete or cement floors and the like possessing greater color retention and more wear resistance than was heretofore attainable through the use of films more or less superficially deposited on the surface.

It is well known in the art that films from paint, lacquers, colored waxes, etc., when applied to concrete or cement floors are, in reality, only superficially imposed on the surface and have no real penetration except in the larger open pores and cracks thereof wherein the material flows freely. The reason that the paint, lacquers, colored waxes, etc., have substantially no penetration in concrete or cement floors when applied thereto is that the said product must necessarily be of relatively high viscosity in order to produce a suitable film thickness and that the coloring materials generally used are insoluble in the carrying vehicle.

In contradistinction, the instant invention provides a composition for mass color treating and dressing of concrete or cement floors and the like which employs a vehicle having a very low viscosity. In addition to the vehicle employed in the instant invention having a very low viscosity it also has a very low degree of polymerization, which vehicle imparts to the novel composition embodying the invention a high capacity to wet the pores of the floor to which it is applied whereby to allow a maximum degree of penetration and absorption by the concrete or cement floor and the like to which the said composition is applied. The novel composition provides a thorough and fixed coloring of the mass penetrated.

The novel composition actually penetrates and works its way well into the concrete or cement floor or other structure to which it may be applied and colors the same to the full depth of its penetration, and, as the composition penetrates and colors, it deposits pigment dispersed therethrough at the surface of the structure treated which becomes engaged in mechanically interlocked relationship in the surface pores and interstices thereof. A floor or other structure treated by the novel composition disclosed herein will show a minimum of wear under heavy traffic without exposing areas of sharply contrasting color as normally the case when employing any of the well-known surface film type floor paints, lacquers, etc. The novel composition applied to a concrete or cement floor and the like does not increase the dusting of a floor under wear and will not crack, craze or peel off inasmuch as the composition becomes an intimate and substantially integral part of the structure to the surface of which it is applied.

Figure 1:
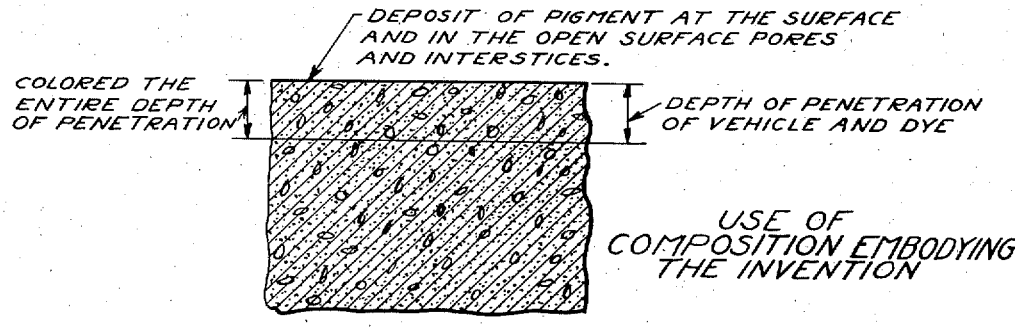
Fig. 1 is an enlarged fragmentary more or less diagrammatic sectional view of a floor or other structure illustrating the use thereon of the novel mass color treating composition.

In the instant invention, the novel composition employed for color treating concrete and cement floors and the like comprises a suitable low viscosity vehicle into which pigment material is dispersed and to which is intimately added a solution of organic dyestuffs by agitation until the dye dissolved in its solvent exists in uniform solution with the said vehicle containing the pigment.

A typical example of the novel composition for color treating concrete or cement floors and the like and method of preparing the same will now be given.

A low viscosity vehicle or base is first prepared which preferably comprises approximately 200–600 pounds of China-wood oil, linseed oil, Perilla oil or other suitable drying oil heated together with approximately 100 pounds of rosin, limed rosin, East India gum, ester gum, phenol-formaldehyde resin or other suitable resin in such a manner that the mixture reaches a temperature of about 560° F. in a period of approximately 25 to 40 minutes, at which time it is withdrawn from the source of heat and allowed to cool to about 475° F. Approximately 800 pounds of petroleum distillate thinner having a boiling range of approximately 130° to 210° centigrade, are then added. Suitable metallic driers such as fatty acid soaps, resinates, and naphthenate of lead, manganese or cobalt may be added in sufficient quantity to accelerate to the desired degree the drying of the drying oil present. Such a vehicle base or an equivalent thereof may be employed which is characterized by being not only low in viscosity but which has a very low degree of polymerization.

A pigment material preferably in red, if red dye is to be used; in green, if green dye is to be used, etc., is added to the vehicle base by employing a suitable mill such as a five roll mill, buhr stone mill or the like to assure thorough dispersion therein.

A solution of dyestuffs of the type soluble in coal tar solvent such as high flash naphtha is prepared using the same color and preferably a little darker than the color of the pigment material employed. The solution of dye dissolved in its solvent is then added to the mixture of vehicle base and pigment and the composition is agitated until the dye exists in uniform solution with the vehicle.

In other words, the final product comprises the herein defined ingredients or the equivalents thereof and the said ingredients are present therein in the following proportions:—a dispersion of finely ground pigment material in a base composed of a drying oil and resin miscible with coal tar solvents wherein the drying oil is present in 2 to 6 times the quantity of the resin, the said base including a petroleum distillate thinner from 1⅓ to 4 times the amount of drying oil employed, and a solution of dyestuffs soluble in coal tar solvent added to said pigmentized base in sufficient amount to impart to the resulting composition the desired degree of color, penetration and scrubbability into a cementitious structure being color treated thereby without deposition of a continuous film thereover.

When the composition is to be applied to a relatively dense structure such as stone or well tamped and troweled concrete, the solution of dyestuffs employed in the composition is made up by using a suitable volume of coal tar solvent to make the composition sufficiently fluid to carry the dyestuffs and pigment well into the surface pores and interstices of the structure being color treated. By manufacturing the composition first as a base with the pigment dispersed therethrough and then adding the desired solution of dyestuffs soluble in a coal tar solvent, which solvent of course is volatile, the invention may be practiced with two distinct advantages: First, a large amount of base may be made up and not pigmentized or diluted by the solution of dyestuffs in a coal tar solvent until orders are filled, thus saving much tankage in the manufacturer's plant. Second, the composition may be designed by anyone skilled in the art at any time after the base is prepared to accommodate it particularly to more or less porous structures and to particular color requirements by employing more or less pigment and volume of solution of dyestuffs in a coal tar solvent with more or less color density.

Although but one method of manufacture of the invention is disclosed herein in detail, other methods of manufacture obvious to those skilled in the art may be employed to provide a resulting composition having a low viscosity, a high degree of polymerization, the desired coloring qualities, and a fluidity such as will accommodate the resulting composition to be scrubbed easily and readily into structures of more or less degree of porosity.

The novel composition disclosed herein for mass color treating and dressing concrete and cement floors and the like increases the waterproofness of the floor or other structure treated thereby, however, if a composition having extremely high waterproofing qualities is desired, paraffin wax, candelilla wax or other suitable mineral or vegetable waxes may be added to the vehicle. In the example hereinbefore given, it has been found that the addition of from 25 to 40 pounds of paraffin wax or the like to the vehicle after it has been allowed to cool to about 475° F. will materially increase the waterproofness of a concrete or cement floor treated by the novel composition. In other words, in the event wax is used in the composition, the amount of wax employed is 25% to 40% by weight of the resin employed in the base.

In addition to increasing the waterproofness of floors or the like treated with the novel composition, it has been found that the inclusion therein of a wax in small quantity retards the drying of the composition during application sufficiently to permit it to be scrubbed deeply and uniformly into the surface pores and interstices of the floor or the like treated thereby.

The quantity of pigment and dyestuffs employed is sufficient in each instance to provide a composition capable of coloring concrete or cement floors or other structures to the desired shade of color.

The novel composition is preferably applied to a dry concrete or cement floor or the like by means of a short stiff bristled brush using a slight scrubbing motion and in sufficient quantity to have at the surface being treated during the said scrubbing motion slightly more composition than the concrete or cement floor or the like will instantly absorb. Because of the employment of a vehicle in the novel compound which has an extremely low viscosity, and because the novel compound has a low degree of polymerization, the novel compound will penetrate immediately into concrete or cement floors or like structure upon application thereto and with little scrubbing.

When applied to a dry concrete or cement floor or the like the vehicle and solvent of the novel composition penetrates to a considerable depth, sometimes one-quarter of an inch or more carrying with it the dye which remains and colors the concrete A small portion of the pigment dispersed in the vehicle remains on the surface; however, due to the low viscosity and low degree of polymerization of the vehicle employed and the dispersion of the pigment therethrough, the remainder of the pigment is drawn into the surface pores and interstices of the concrete or cement or other structure to which the novel composition is applied where, upon drying, it becomes mechanically bonded and interlocked with the structure treated in such an intimate relationship as to be, in fact, substantially an integral part thereof.

After a concrete or cement floor or the like is color treated with the novel composition and the said composition is permitted to dry, a gloss coat or dressing composed of a pigmented wax preferably of the same color as the pigment in the said composition may be applied by a vigorous polishing preferably with a mechanical buffer to embed further into the floor or the like the pigment material of the composition which had been carried into the pores and interstices in the surface of the said floor or like structure treated thereby. While the gloss coat need not be employed, it is generally used where a highly polished finished surface is desired. Because of the mass color treatment of the floor or surface under the pigmented wax gloss coat, the gloss coat may be renewed as required where heavy traffic occurs and the renewed gloss coated floor will blend into the unworn gloss coated floor without unsightly color differentials as encountered when patching the worn surface film of painted floors or floors coated with other surface coatings and films. The gloss coat or dressing when employed, not only provides the glossy surface desired but seals the surface pores and interstices of a floor or the like mass colored by the novel mass coloring composition herein disclosed which adds extra life to the floor treatment.

Fig. 1 of the drawing gives a typical illustration of a floor or the like treated with the novel composition disclosed herein showing the penetration of the vehicle, solvent and dye and the deposit of the pigment dispersed therethrough at the surface and in the surface pores and interstices of the structure treated.

Figure 2:
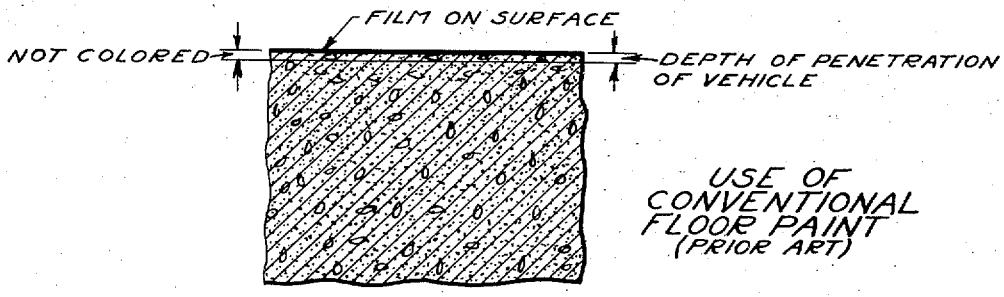
Fig. 2 is an enlarged sectional view similar to Fig. 1 of a floor or other structure illustrating the use thereon of a conventional floor paint.
Figure 3:
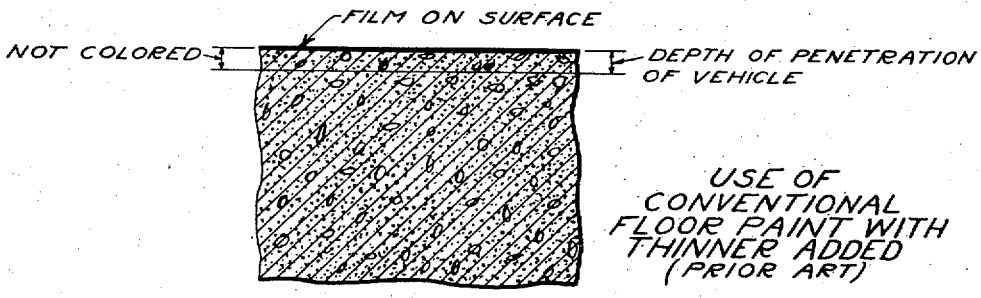
Fig. 3 is an enlarged sectional view similar to Figs. 1 and 2 of a floor or other structure illustrating the use thereon of a conventional floor paint having a thinner added.

Figs. 2 and 3 of the drawing show the effect of the conventional type of paint and like floor dressings on a cement floor covered thereby. It will be observed by particular reference to Fig. 2 that there is very little penetration of the vehicle into the cement when a conventional type of floor paint or film is used and that no actual coloring is accomplished below the film. Fig. 3 shows the effect of using a conventional type of paint or film with a solvent added, it being observed that the penetration, while greater than when no solvent is added to the conventional floor paint, is comparatively small with respect to the penetration of the novel composition disclosed herein, and that there is no coloring of the penetrated portion as is the case when the novel composition disclosed herein is employed.

The continued use of a floor treated with the novel composition herein disclosed will show very little wear in comparison to a floor covered with the conventional type of paint or film of floor dressing or the like inasmuch as the pigment of the novel composition herein disclosed becomes mechanically interlocked within the surface pores and interstices of the concrete or cement floor or other structure to which the novel composition is applied and because a thoroughly colored mass becomes exposed as the surface of the floor becomes worn by continued use and traffic thereover. However, when the conventional type of paint or floor dressing is used, the films deposited on the surface of a concrete or cement floor or the like will crack, craze and wear off and will permit the concrete surface and mass therebelow to become visible in spots after continued use or traffic over a floor coated thereby. In order to maintain the good appearance of a floor covered with the conventional type of paint or film, very frequent and careful maintenance applications thereof are necessary. In the instant invention, the pigment deposited on the surface and in the surface pores and interstices of a floor treated by the novel composition herein disclosed wears very slowly and very gradually exposes the colored mass of the floor therebelow. There is no surface film to be broken as in the case of the use of the conventional floor paints and films and therefore no unsightly contrast between the color of the film applied to the floor and the color of the concrete will develop by wear. A floor colored and treated with the novel composition herein disclosed will have a much longer life without maintenance than a floor covered with a usual type of paint or film inasmuch as it would be necessary to wear away a considerable portion of the floor itself before unsightly contrast with uncolored material below the surface could possibly become apparent.

The novel composition for mass color treatment of concrete or cement floors and the like disclosed herein is comparatively inexpensive in view of the general effectiveness thereof including the long wear, high waterproofing qualities, lasting coloring, ease of application and greater freedom from maintenance of concrete or cement floors or other structures mass colored thereby. The pigmented wax dressing, if employed, provides high luster to a cement floor or the like after the mass color treatment thereof and seals the pigment deposited at the surface and in the surface pores and interstices of the structure treated which materially adds to the life of a floor or like structure treated with the novel mass color treatment composition herein disclosed.

Where the term "drying oil" is used, it is to be understood that it includes such drying oils as China-wood oil, linseed oil, Perilla oil and similar suitable drying oils.

Where the term "resin" is used, it is to be understood that it includes rosin, limed rosin, East India gum, ester gum, phenol-formaldehyde resin or other suitable resin soluble in the drying oil employed.

It is to be understood that the particular compounds and methods disclosed and the procedure set forth are presented herein for the purposes of illustration and explanation only, and that various equivalents can be used and modifications of the composition, method and procedure set forth can be made without departing from the spirit of the invention as defined by the appended claims.

We claim:

1. A liquid composition for the color treatment of cement floors and the like through scrubbing the same into the surface thereof comprising a dispersion of a drying oil and resin vehicle miscible with coal tar solvents composed of 200 to 600 pounds of a drying oil of the group consisting of China-wood oil, linseed oil and Perilla oil, 100 pounds of a resin of a type soluble in the drying oil, approximately 800 pounds of petroleum distillate thinner, a finely ground pigment material, and a solution of dyestuffs of the type soluble in coal tar solvents, the said liquid composition being characterized by having a sufficiently low viscosity to admit of scrubbing into the surface of a cementitious structure being color treated thereby without deposition of a continuous film thereover.

2. A liquid composition for the color treatment of cement floors and the like through scrubbing the same into the surface thereof comprising a dispersion of a drying oil and resin vehicle miscible with coal tar solvents composed of 200 to 600 pounds of a drying oil of the group consisting of China-wood oil, linseed oil and Perilla oil, 100 pounds of a resin of a type soluble in the drying oil, a wax in sufficiently small quantity to retard the drying and hardening of the vehicle without materially increasing the viscosity thereof, approximately 800 pounds of petroleum distillate thinner, a finely ground pigment material, and a solution of dyestuffs of the type soluble in coal tar solvents, the said liquid composition being characterized by having sufficiently low viscosity to admit of scrubbing into the surface of a cementitious structure being color treated thereby without deposition of a continuous film thereover.

3. A liquid composition for the color treatment of cement floors and the like through scrubbing the same into the surface thereof comprising a dispersion of a drying oil and resin vehicle miscible with coal tar solvents composed of 200 to 600 pounds of a drying oil of the group consisting of China-wood oil, linseed oil and Perilla oil, 100 pounds of a resin of a type soluble in the drying oil, 25 to 40 pounds of wax, approximately 800 pounds of petroleum distillate thinner, a finely ground pigment material, and a solution of dystuffs of the type soluble in coal tar solvents, the said liquid composition being characterized by having a sufficiently low viscosity to admit of scrubbing into the surface of a cementitious structure being color treated thereby without deposition of a continuous film thereover.

4. A liquid composition for the color treatment of cementitious structures through scrubbing the same into the surface thereof comprising a dispersion of a drying oil and resin vehicle composed of a mixture of 200 to 600 pounds of a drying oil of the group consisting of China-wood oil, linseed oil and Perilla oil and 100 pounds of a resin of a type soluble in the drying oil heated together at such at rate as to permit the mixture to reach about 560° F. in approximately 30 minutes from which temperature the mixture is permitted to cool to an initial thinning temperature of 475° F., approximately 800 pounds of petroleum distillate thinner, a finely ground pigment material, and a solution of dyestuffs in coal tar solvent.

5. A liquid composition as claimed in claim 4 in which 25 to 40 pounds of wax is included in the vehicle.

6. A liquid composition for the color treatment of cement floors and the like through scrubbing the same into the surface thereof comprising a dispersion of a finely ground pigment material in a vehicle miscible with coal tar solvents composed of 200 to 600 pounds of a drying oil of the group consisting of China-wood oil, linseed oil and Perilla oil, 100 pounds of a resin of a type soluble in the drying oil, approximately 800 pounds of petroleum distillate thinner, and a solution of dyestuffs of the type soluble in coal tar solvents, the resulting composition being of sufficiently low viscosity and low degree of polymerization and the dyestuffs being present in sufficient amounts to impart the desired degree of coloring and to admit of scrubbing the said resulting composition into the porous surface of a cementitious structure being color treated thereby without deposition of a continuous film thereover.

7. A liquid composition for the color treatment of cement floors and the like through scrubbing the same into the surface thereof comprising a dispersion of a finely ground pigment material in a vehicle base miscible with coal tar solvents composed of 200 to 600 pounds of a drying oil of the group consisting of China-wood oil, linseed oil and Perilla oil, 100 pounds of a resin of a type soluble in the drying oil, and approximately 800 pounds of petroleum distillate thinner, and a solution of dyestuffs of the type soluble in coal tar solvents added to said pigmentized base in uniform solution therewith and in sufficient amount to impart to the porous structure to be color treated by the resulting composition the desired degree of coloring and to admit of scrubbing the said resulting composition into the porous surface of a cementitious structure being color treated thereby without deposition of a continuous film thereover.

8. A liquid composition for the color treatment of cement floors and the like through scrubbing the same into the surface thereof comprising a dispersion of a finely ground pigment material in a base composed of a drying oil and resin miscible with coal tar solvents wherein the drying oil is present in 2 to 6 times the quantity of the resin, the said base including a petroleum distillate thinner from 1⅓ to 4 times the amount of drying oil employed, and a solution of dyestuffs soluble in coal tar solvent added to said pigmentized base in sufficient amount to impart to resulting composition the desired degree of color, penetration and scrubbability into a cementitious structure being color treated thereby without deposition of a continuous film thereover.

9. A liquid composition as claimed in claim 8 in which 25% to 40% of wax by weight of the resin is included in the base.

RALPH E. MADISON.
ARTHUR T. SAUNDERS.